Figure 1:
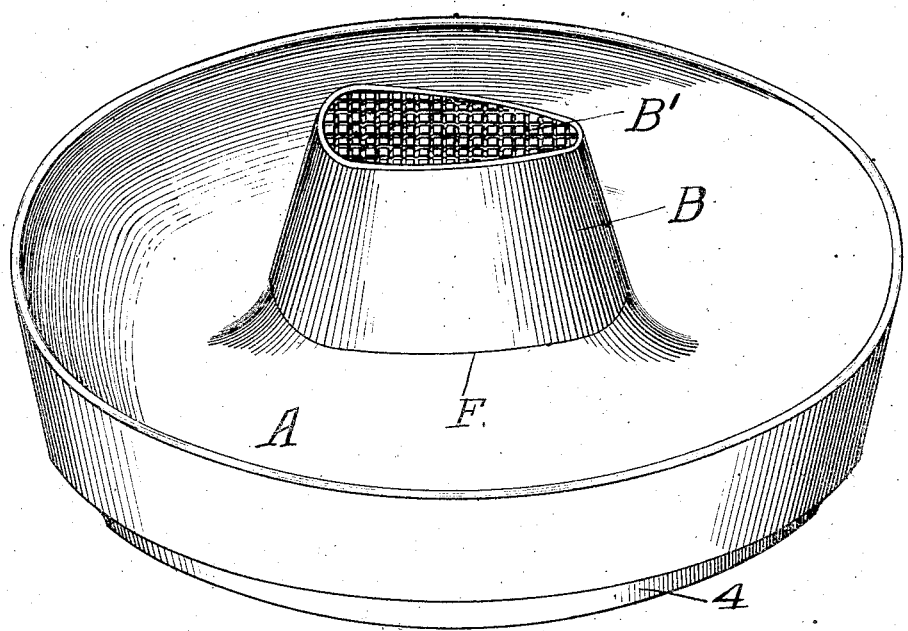

R. A. PARSONS.
COMBINATION NUT CRACKING DEVICE.
APPLICATION FILED SEPT. 27, 1911.

1,099,996.

Patented June 16, 1914.

2 SHEETS—SHEET 1.

Witnesses:
Edgar F. Beaubien
Carl E. Howe

Inventor:
Ralph A. Parsons
by Hawley & Spellman
Att'ys

R. A. PARSONS.
COMBINATION NUT CRACKING DEVICE.
APPLICATION FILED SEPT. 27, 1911.
1,099,996.
Patented June 16, 1914.
2 SHEETS—SHEET 2.
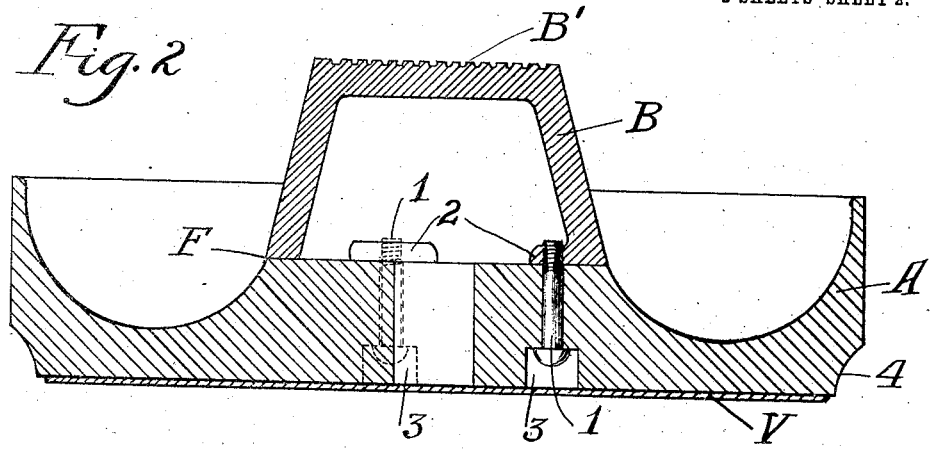
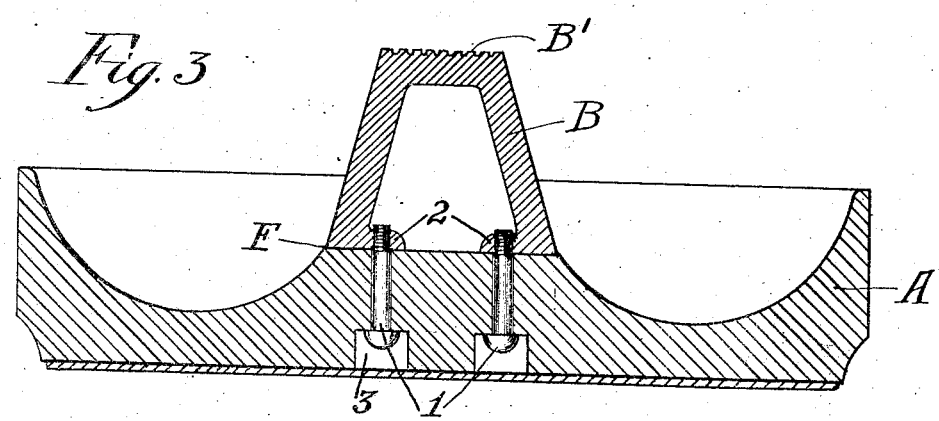
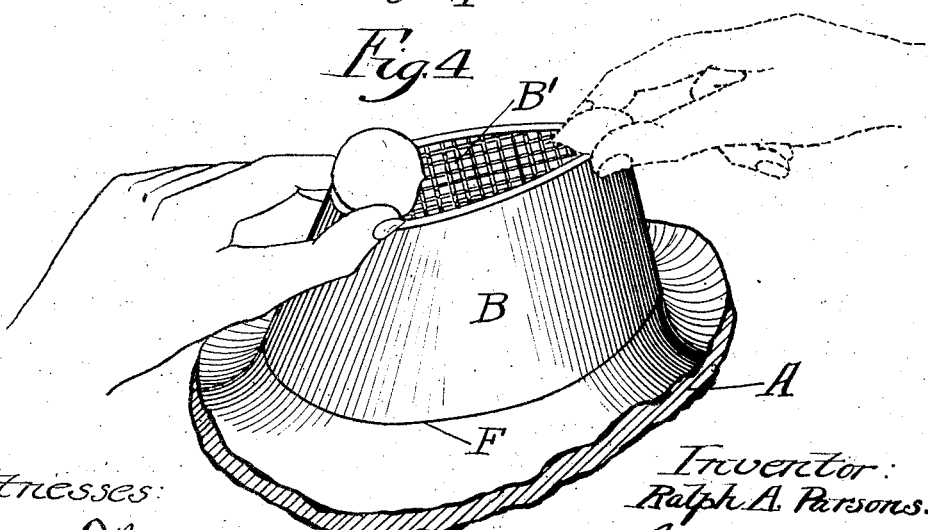
Witnesses:
Edgar F. Beaubien
Earl E. Howe
Inventor:
Ralph A. Parsons.
by Hawley & Spellman
Atty.

UNITED STATES PATENT OFFICE.

RALPH A. PARSONS, OF DENVER, COLORADO.

COMBINATION NUT-CRACKING DEVICE.

1,099,996.   Specification of Letters Patent.   Patented June 16, 1914.

Application filed September 27, 1911. Serial No. 651,653.

*To all whom it may concern:*

Be it known that I, RALPH A. PARSONS, a citizen of the United States, and a resident of the city of Denver, county of Denver, and State of Colorado, have invented certain new and useful Improvements in Combination Nut-Cracking Devices, of which the following is a full, true, and exact description, such as will enable others skilled in the art to which it appertains to make and use the same.

My invention belongs to the class of articles used for cracking or breaking edible nuts, and the object of my invention is to provide a unitary, self-contained article which will combine or embody all of the essential parts in convenient form for serving, cracking and holding edible nuts; my object further being to provide a novel nut-cracking outfit of this character which will have a nut cracking anvil portion contained within a bowl or receptacle in convenient position to be used for cracking the nuts served in the bowl, and which, because of the nut-containing bowl and anvil being permanently associated and ready for use, may be served as any general or individual dish at a table; which will be clean, extremely convenient and which may be arranged in plain or ornamental design according to individual taste.

A further object of my invention is to provide a nut-cracking device which will eliminate all possibility of a person's fingers being injured by misdirected blows.

With these objects in view my invention comprises a novel article of manufacture in the form of a plain or ornamental nut bowl within which is a nut cracking anvil or crushing surface always in convenient position and arranged so that as the nuts are cracked they drop into the dish and are not scattered about over the floor or table.

My invention further resides in an article of this character having an anvil or pounding surface so formed that no matter what size of nut is being cracked the person's fingers holding the nut will rest against the side thereof and not upon the surface, and should the hammer accidentally strike the fingers it will not bruise or injure them, but instead will simply force the fingers down along the side of the anvil.

In a more specific aspect my invention may be said to consist in a nut cracking device as herein disclosed and comprising a nut-cracking anvil formed for accommodation of different sizes of nuts and positioned within and supported by a bowl-shaped base adapted to contain whole and cracked nuts.

The accompanying drawings, which form a part of this specification, illustrate my invention.

Figure 5:
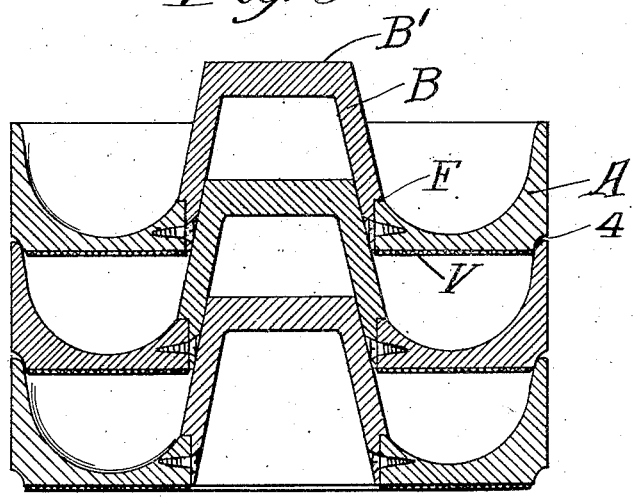

In these drawings, Figure 1 is a perspective view of a simply designed article embodying my invention; Figs. 2 and 3 are diametrical sections taken at right angles to each other showing the structural details thereof; Fig. 4 is a perspective view of the anvil portion illustrating the manner in which the fingers hold the different-sized nuts thereon without danger or injury from misdirected blows when a hammer is used to crack the nuts; and Fig. 5 illustrates my invention modified so that a number of devices may be nested together in a stack like dishes.

My novel nut-cracking outfit irrespective of the particular design which may be given to it serves many purposes and functions as a self-contained article. It constitutes a receptacle or bowl for carrying and holding the whole and cracked nuts, either in one general compartment or several, as suits the tastes and requirements of the individual, and at the same time a nut-cracking device which is permanently associated with the bowl where it is always handy, convenient and ready for use. Because of these features it may be passed from guest to guest at a table or among a group of people, or several of them may be served as individual dishes, each a complete outfit in itself. In cracking nuts the guests are not likely to scatter the particles about the floor or table, but instead drop them directly into the bowl.

The whole structure presents an artistic appearance and may constitute a part of a person's tableware, just as any other dish. The bowl A obviously not only serves as a nut container, but as a base or support for the anvil B which in the form shown in the drawings rises a convenient distance above the rim of the bowl. When the anvil is centrally located, as illustrated herein, the person's arm or wrist generally rests upon the rim of the bowl while holding a nut upon the surface B' of the anvil, but this, of course, depends to a great extent upon the location of the hammer surface of the anvil within the bowl.

The drawings show a bowl-like base having a gradually rising central portion B, which reaches the upper flat surface B', which is the hammer surface of the anvil and, preferably, is more or less roughened to prevent the nuts from slipping. By forming the structure in this manner, the blows of a hammer cracking the nuts are distributed over the broad area or bottom surface of the bowl, hence when the device is held in a person's lap it does not occasion any discomfort. This, of course, may be overcome to a still greater extent by padding the bottom of the bowl, for instance, with a layer of felt V, which also prevents scratching or marring a polished table surface.

No matter what shape the bowl may take, I prefer that the surface upon which the nuts are crushed or broken be formed in the manner shown to accommodate the different sizes of nuts, even when a crushing lever is used in conjunction therewith, hence the person's fingers holding the nut will rest against the sides of the anvil, as illustrated in Fig. 4, and are not likely to be crushed between the surface and the hammer or other instrument used to crack the nut. Instead, the fingers will slide down the sides of the anvil portion and will not be bruised or injured. The advantage in graduating the width of the surface B' enables a person to select that portion thereof which substantially corresponds to the size of the nut and thus rest his fingers against the sides of the anvil in holding the nut thereon.

The whole structure may, of course, be made as artistic and unique as desired. The plain, simpler form shown, however, well illustrates my invention. The choice of materials likewise is a matter of individual preference, or manufacturing expense. It is quite essential, however, that the pounding surface be sufficiently solid and rigid to withstand the hammer blows. Very excellent results are obtained by making the portion B from the pounding surface down to line F of metal, such as brass, copper, steel or the like, and the remaining portion of the bowl-like base A of wood. Or it may be made integrally in one piece of metal or wood, thickened at the anvil or pounding surface sufficiently to withstand the hammer blows. The structure shown is composed of two pieces, the anvil being of metal and fastened to the bowl from the bottom, as clearly shown in Figs. 2 and 3 by the bolts 1 which screw into instanding lugs 2 of the hollow anvil portion. The heads of the bolts are sunk into sockets 3, so as to leave the bottom of the bowl flat. These, however, are matters of construction dependent to a considerable extent upon the expense and convenience of manufacturing the article.

My invention possesses the rather unique feature that it may be made up in sets for individual use by constructing them so that they may be stacked in the same manner that dishes are piled. As shown in Fig. 5 the bottom of the bowl is provided with an opening so that the anvil portion of one may fit within the bottom of the one next above it in the stack. The bottom edges 4 are grooved to fit the rims. This manner of fitting the devices may be carried out whether or not the location of the anvil is central within the bowl.

Any sort of hammer may obviously be used with my novel device. In some instances I use hammers small enough to lie within the bowls when the devices are stacked up.

It will be noted that the cracking of nuts is thus made interesting and enjoyable, the whole outfit being self-contained and always ready for use. It may be made as elaborate or as simple in design as individual choice may require.

Having thus described my invention, I claim as new and desire to secure by Letters Patent:

1. The improvement herein described comprising a nut bowl in combination with an anvil fixed therein and having a hammer surface, said anvil being of denser material than the bowl and the bowl, though of lighter material, being adapted to sustain blows communicated through the anvil.

2. The improvement herein described comprising a nut bowl having a flat bottom adapting it for use upon the lap in combination with an anvil fixed therein and having a hammer surface, said anvil being of denser material than the bowl and the bowl, though of lighter material, being adapted to sustain blows communicated through the anvil.

3. The improvement herein described comprising a flat bottomed nut bowl in combination with an anvil fixed therein and having a hammer surface rising above the rim of the bowl, said anvil being of denser material than the bowl and the bowl though of lighter material, being adapted to sustain blows communicated through the anvil.

4. The improvement herein described comprising a nut bowl in combination with an anvil fixed therein, said anvil having a hammer surface broad at one end and tapering to a narrow end to accommodate nuts of different sizes and said anvil being of denser material than said bowl.

5. The improvement herein described comprising a nut bowl in combination with a substantially conical anvil fixed therein, said anvil being of denser material than the bowl and having a tapered hammer surface broad at one end and narrow at the other to accommodate nuts of different sizes.

6. The improvement herein described comprising a substantially conical nut cracking anvil having a hammer surface broad at one end and tapering to a narrow end, to accommodate nuts of different sizes.

7. The improvement herein described comprising a nut bowl of relatively light weight, in combination with an anvil of relatively heavy weight, fixed in the bowl, and presenting a hammer surface above the rim thereof, substantially as described.

8. The improvement herein described comprising a nut bowl in combination with a relatively heavy anvil fixed therein and presenting a tapered hammer surface, which is wide at one end and narrow at the other, to receive nuts of different sizes, substantially as described.

9. The improvement herein described comprising a nut bowl in combination with a relatively heavy anvil resembling a truncated cone, fixed in the bottom of said bowl and presenting a hammer surface above the rim of the bowl, substantially as and for the purpose specified.

In testimony whereof I have hereunto set my hand, this 21st day of September, 1911, in the presence of two subscribing witnesses.

RALPH A. PARSONS.

Witnesses:
HENRY B. HIGGINS,
J. DURWARD CUMMINGS.